C. Bocking.
Wood Screw.

Nº 88,539.      Patented Apr. 6, 1869.

Witnesses:
W. B. Deming
J. E. M. Bowen

Inventor,
Carl Bocking
By Knight &
attorneys.

CARL BOCKING, OF PHILADELPHIA, PENNSYLVANIA, ASSIGNOR TO HIMSELF AND COATES WALTON, OF THE SAME PLACE.

Letters Patent No. 88,539, dated April 6, 1869.

IMPROVEMENT IN SCREWS.

The Schedule referred to in these Letters Patent and making part of the same.

*To all whom it may concern:*

Be it known that I, CARL BOCKING, of Philadelphia, in the county of Philadelphia, and State of Pennsylvania, have invented certain new and useful Improvements in Wood-Screws; and I do hereby declare that the following is a sufficiently full, clear, and exact description thereof, to enable one skilled in the art to which my said invention appertains, to make and carry it into effect, reference being had to the accompanying drawings, which are made a part of this specification, and in which—

Figure 1:
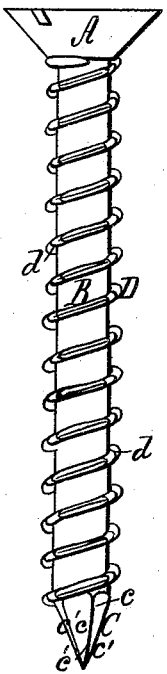
Figure 2:
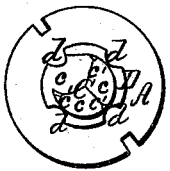

Figure 1 is an elevation of my improved screw, and
Figure 2, an inverted plan view thereof.

My invention relates to a novel construction of screw, whereby ease of introduction and strength are obtained in a much greater degree than in any other screw with which I am acquainted.

I construct my screw of iron, or other suitable metal, with a head, A, of any approved form, and its core, B, of equal diameter, from the lower side of said head to the commencement of the point C, of equal diameter throughout, and surround said core its entire length with a spiral thread, D, divided longitudinally of the core at one or more points, or at irregular intervals, by nicks, or grooves, $d$, which enable the thread to cut through the wood, as it is screwed in, and thus greatly lessen the power requisite to drive it.

The point C may have three or more sides, and be of any desired length to render its introduction easy.

Its sides $c$ are concave, so as to render its angles $c'$ more acute; the action of said point C being to cut a hole of the same diameter as the core B, for its reception.

Having thus described my invention,
What I claim as new therein, and desire to secure by Letters Patent, is—

The angular point C, with its cutting-edges $c'$, in combination with a wood-screw, substantially as described.

To the above specification of my improvement in wood-screws, I have signed my hand, this 24th day of April, A. D. 1868.

CARL BOCKING.

Witnesses:
THOS. R. BROWN,
JULIUS F. GRAF.